H. HESS.
BALL BEARING.
APPLICATION FILED OCT. 2, 1908.

924,904.

Patented June 15, 1909.

WITNESSES

INVENTOR
Henry Hess

UNITED STATES PATENT OFFICE.

HENRY HESS, OF PHILADELPHIA, PENNSYLVANIA.

BALL-BEARING.

No. 924,904.  Specification of Letters Patent.  Patented June 15, 1909.

Application filed October 2, 1908. Serial No. 455,870.

*To all whom it may concern:*

Be it known that I, HENRY HESS, a citizen of the United States, and resident of Philadelphia, in the county of Philadelphia and State of Pennsylvania, have invented a certain new and useful Improvement in Ball-Bearings, of which the following is a specification.

This invention relates to separating mechanism for spacing apart the balls or other anti-friction rollers in a bearing.

In anti-friction bearings, and especially ball bearings of the "annular" type it is found that under certain conditions some of the balls tend to run faster than others and it is, therefore, desirable to separate the balls and provide means by which they may change their positions slightly in relation to each other and may be returned to their normal positions. Elastic separators have been provided for this purpose, but these separators have heretofore been arranged so that they are in contact continually with the balls.

The purpose of this invention is to provide separating devices which are normally free from contact with the balls, but which engage the balls when they move a certain distance from normal position and urge them to return to their normal position.

Structures by means of which the invention is carried out will now be described but it is to be understood that these structures are only exemplifications and that the invention may be embodied in other forms.

Figure 1:
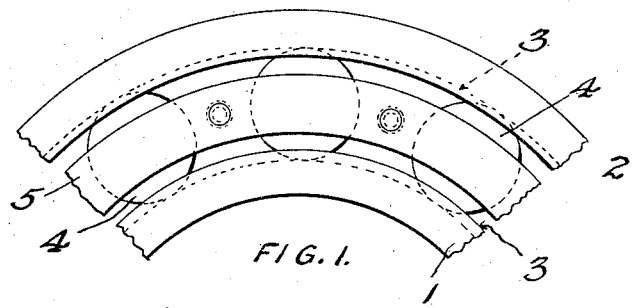
Figure 2:
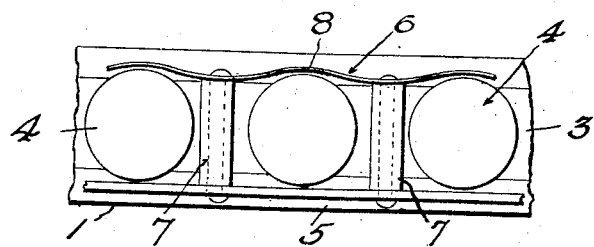
Figure 3:
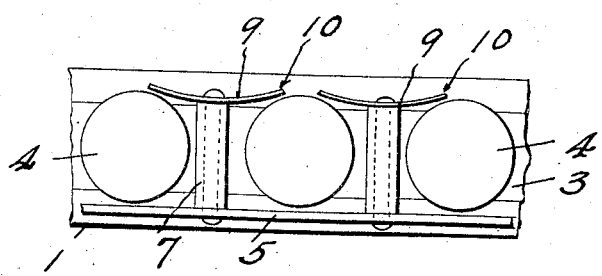

In the drawing: Figure 1 is an end view of a fragment of a ball bearing embodying the invention. Fig. 2 is a plan view of a section of a bearing with the outer ring removed and Fig. 3 is a view similar to Fig. 2 of a modified form of the invention.

Reference character 1 designates the inner bearing ring and 2 the outer ring. The rings are provided with races 3 which are generally of curved cross-section. In the races are a series of balls 4. These balls are to be kept apart so that they may at times vary in their distances from each other. For this purpose I provide separating mechanism which will now be described.

A supporting ring 5 which may be of stiff material is arranged at one side of the ball series. At the other side of the ball series, as shown in Fig. 2, is an elastic ring 6 usually of spring-steel which forms the active separating element. Ring 6 is secured to the supporting ring by spreaders 7. Elastic ring 6 is curved so that at the points 8 substantially mid-way between the spreaders it is appreciably separated from the balls and thus permits a clearance both between itself and the balls and between the balls and the supporting ring 5 when the balls, as shown in the figure, are in their normal positions mid-way between the spreaders. The curves in ring 6 may be imparted to it before the bearing is assembled or the ring may be made slightly larger than its completed diameter and buckled by connecting it to the spreaders so that it assumes the shape shown in Fig. 2.

When the bearing is in operation, at times some of the balls tend to run faster than the others and when this occurs such balls approach one of the spreaders and encounter the curved elastic ring 6 and the supporting ring 5. The elasticity of ring 6 permits a slight movement of the balls away from their normal position after they encounter the rings but as soon as the tendency which causes the described movement of the balls is discontinued the elastic pressure exerted upon the balls by ring 6 causes them to return to their normal positions mid-way between the spreaders.

In Fig. 3 it is shown that the active separating element need not be a continuous ring. The spreaders 7 are provided with a plurality of flexible curved segments 9, the ends 10 of which closely approach but do not touch the balls when they are in normal position. Upon movement of the balls away from their normal position the curved segments 9 will tend to return them to normal position in substantially the same manner as has been described with reference to Fig. 2.

It will be apparent that instead of a rigid supporting ring 5, as shown in Fig. 2, another elastic ring similar to 6 might be employed, also that other changes may be made within the scope of the invention.

I claim:

1. The combination of two bearing rings provided with races, balls in the races and separating mechanism comprising an elastic member normally free from the balls and constructed and arranged so that on movement of the balls from normal position they engage the member and are urged by it toward their normal position.

2. The combination of two bearing rings provided with races, balls in the races and separating mechanism comprising a plurality of separated elastic members normally free from the balls but constructed and arranged so that on movement of the balls from normal position they engage the members and are urged by them toward normal position.

3. The combination of two bearing rings provided with races, balls in the races and separating mechanism comprising a member normally free from the balls and constructed and arranged so that on movement of the balls from normal position their outer faces encounter the member and the balls are urged by the member to return to their normal position.

4. The combination of two bearing rings provided with races, balls in the races and separating mechanism comprising an elastic member normally free from the balls and constructed and arranged so that on movement of the balls from normal position their outer faces encounter the member and the balls are urged by the member to return to their normal position.

5. The combination of two bearing rings provided with races, balls in the races and separating mechanism comprising a supporting ring, an elastic member arranged at one side of the series of balls and normally free from the balls but adapted to engage the balls upon their displacement from normal position and to urge them to return to normal position.

6. The combination of two bearing rings provided with races, balls in the races and separating mechanism comprising a supporting ring at one side of the ball series, an elastic member at the other side of the ball series, a spreader connecting the elastic member to the ring, the elastic member being arranged so that there is a clearance between it and the balls when they are in their normal position.

7. The combination of two bearing rings provided with races, balls in the races and separating mechanism comprising a supporting ring at one side of the ball series, spreaders connected to the supporting ring, and an elastic ring on the other side of the ball series connected to the spreaders, the elastic ring being curved so that it is normally free from the balls and so that upon displacement of the balls from normal position they engage the elastic ring and are urged by it to return to normal position.

HENRY HESS.

Witnesses:
NETTIE L. HAHN.
MARY M. CALLA.